Figure 1:
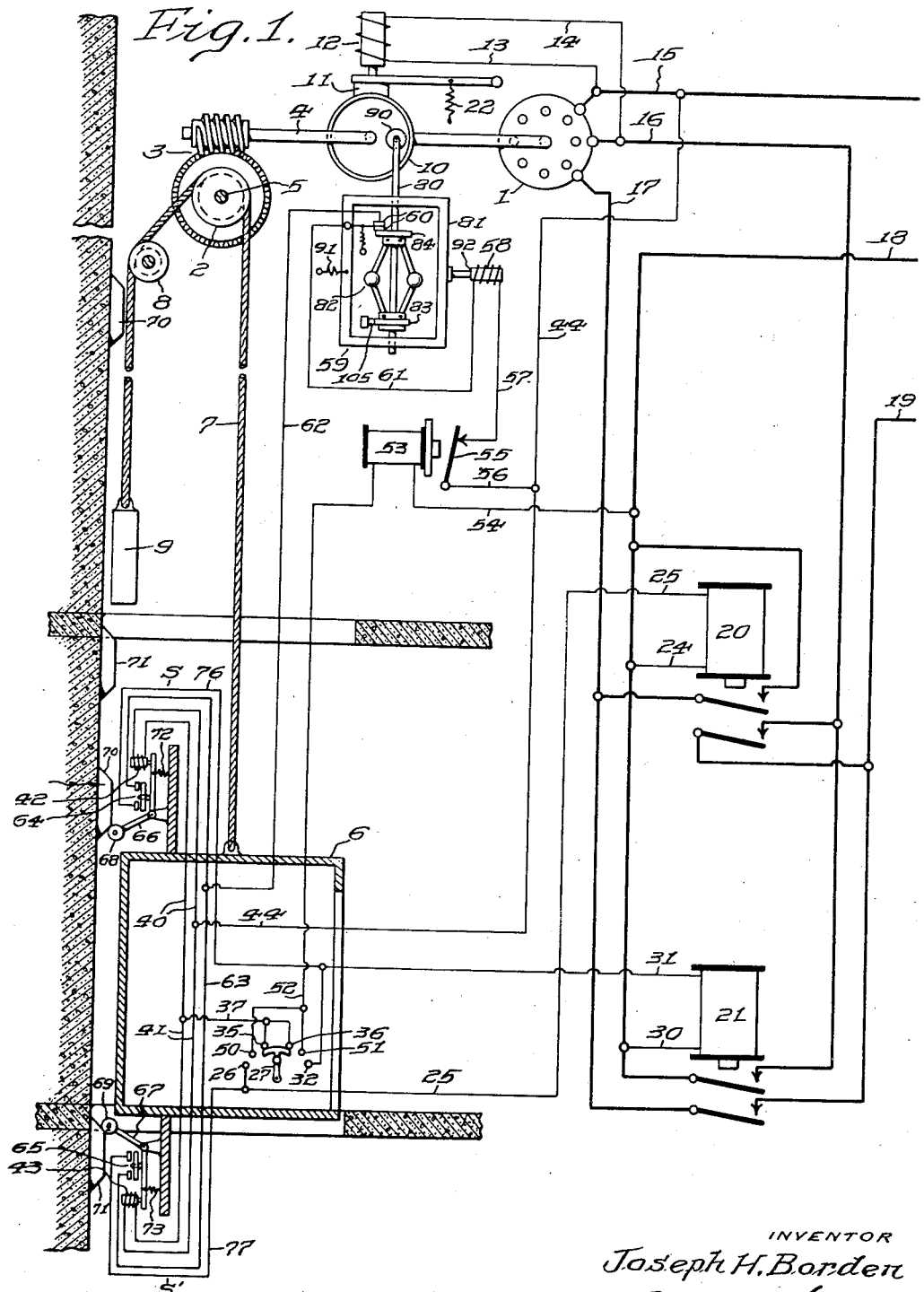

May 9, 1939.  J. H. BORDEN  2,157,396

ELEVATOR LEVELING SYSTEM

Filed Dec. 1, 1937 2 Sheets-Sheet 1

WITNESS
F. J. Hartman.

INVENTOR
Joseph H. Borden
BY George K. Helbut
ATTORNEY

May 9, 1939.　　　　J. H. BORDEN　　　　2,157,396
ELEVATOR LEVELING SYSTEM
Filed Dec. 1, 1937　　　2 Sheets-Sheet 2
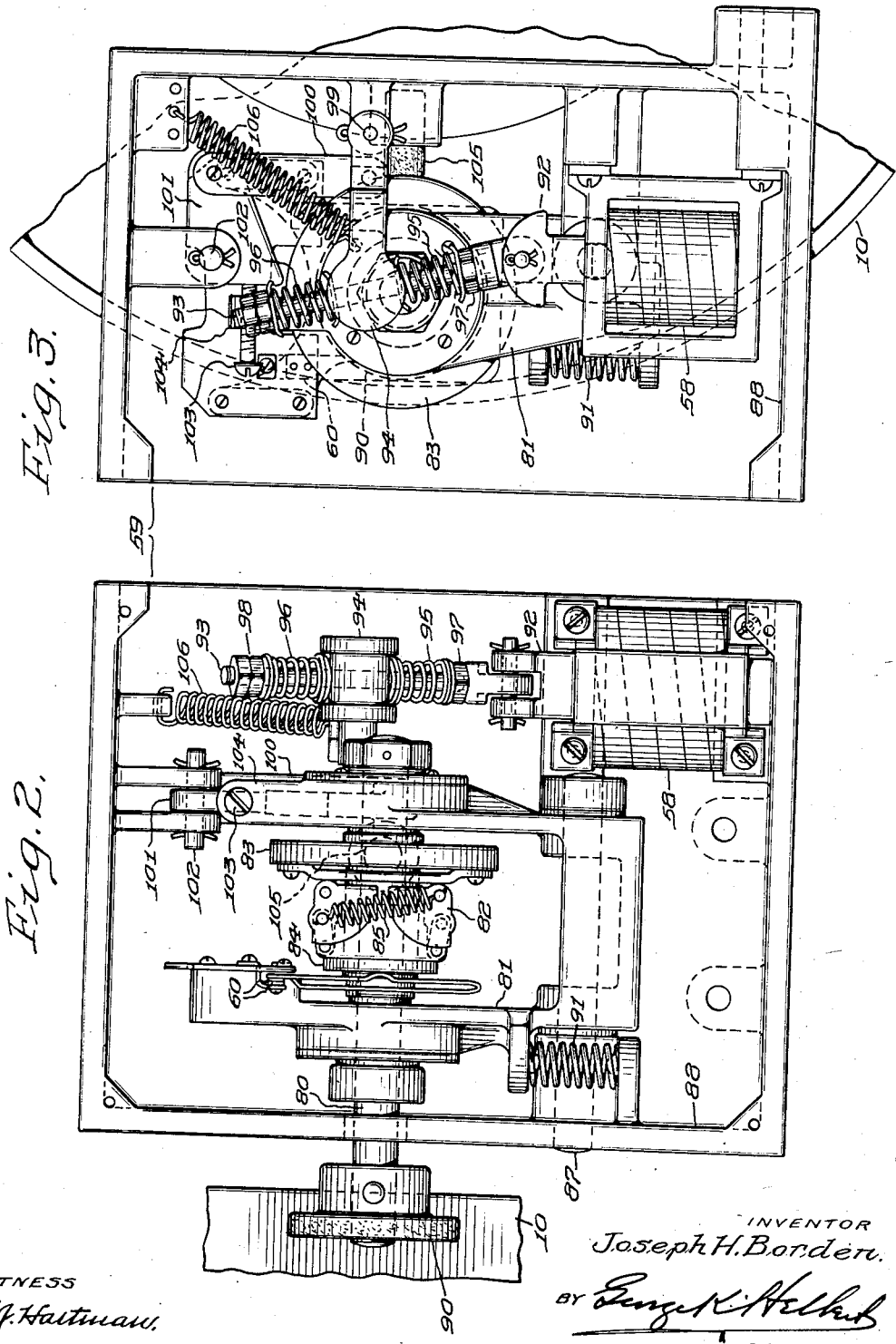
INVENTOR
Joseph H. Borden.
BY
ATTORNEY
WITNESS Patented May 9, 1939

2,157,396

UNITED STATES PATENT OFFICE 2,157,396

ELEVATOR LEVELING SYSTEM

Joseph H. Borden, Philadelphia, Pa., assignor to Atlantic Elevator Company, Inc., Philadelphia, Pa., a corporation of Pennsylvania Application December 1, 1937, Serial No. 177,420

15 Claims. (Cl. 187—29)

This invention relates to leveling systems for elevators and is particularly directed to an improved system for bringing the car to a stop automatically and substantially exactly level with the desired floor without attention of the operator.

In my prior Patent 1,939,656 issued December 19, 1933, I have described and claimed a method and apparatus directed to the same general purpose which utilize control mechanism actuated in accordance with the power input of the main driving motor for automatically deenergizing the latter at a suitable point before the car reaches the floor so as to bring it to a stop substantially at the floor, and the present invention when embodied in a system of that character affords even more accurate leveling, but it may also be advantageously incorporated in substantially any elevator system, whether manually or automatically operated or utilizing direct or alternating current, to level the car with the floor, after it has been brought to a stop or almost to a stop by operation of appropriate control mechanism at a point close to but not precisely level with the floor.

In certain types of elevators it is the practice to utilize variable speed motors for driving the winding drum over which the elevator hoisting cable passes and to operate the motor at its slow or "leveling" speed for a short period during the approach of the car to the floor and just prior to stopping it; elevators of this kind are fairly satisfactory with alternating current motors capable of operating at suitable normal and low speeds, but this practically limits such elevators to a ratio of about 6:1 between their normal and low speeds as efficient alternating current motors having a higher speed ratio are not usually obtainable. Thus in high speed elevators the low speed of the motor is too high for satisfactory leveling if this ratio between the motor speeds be observed, and if it is enlarged so as to afford a sufficiently low leveling speed and a sufficiently high normal speed the large number of poles required for the low speed winding of the motor results in extreme magnetic leakage and low efficiency. Two speed alternating current motors are therefore unsuitable for elevators in which a high maximum speed, for example 150 ft. per minute or more is required, since they cannot be made to operate economically and afford a leveling speed slower than about 25 ft. per minute, that is, one-sixth of the normal or maximum speed, whereas a leveling speed materially greater than 20 ft. per minute is ordinarily too great.

Other means for obtaining suitable low speed operation for leveling have also been suggested, including those disclosed in my Patent 1,972,372 issued September 4, 1934, utilizing a variable speed direct current motor, but there are many conditions under which alternating current motors are preferred and so far as I am aware no means have heretofore been known which provide satisfactory control for both alternating and direct current motors to afford speed differentials sufficiently great to permit the elevator to be operated at 200 ft. per minute or more during normal travel and also at about 15 to 20 ft. per minute during leveling as the car approaches the floor.

It is therefore a principal object of this invention to provide an elevator control system adapted for use with either alternating or direct current driving motors to give a suitable low rate of car travel during leveling irrespective of its rate when the motor is operating at normal or maximum speed in moving the car between the floors.

A further object is to provide elevator driving motor control means embodying speed responsive control mechanism interconnected with the main motor control circuits in such way as to automatically move the car slowly for short distances to bring it accurately to rest at any desired floor after it has been stopped or almost stopped in the vicinity of the floor through the operation of the other parts of the system, whether including automatic leveling mechanism or not.

A still further object is to provide in combination with an elevator driving motor, means for accurately leveling the car including mechanism controlled in accordance with the motor speed for interrupting its circuit upon the attainment of a predetermined speed lower than its normal operating speed and means for bringing this mechanism into play to level the car when it is near the floor at which it is to be stopped but maintaining it inoperative when the car is at any point other than one immediately adjacent such floor, it being of course also inoperative when the car is precisely at the floor level.

Other objects, purposes and advantages of the invention will hereinafter more fully appear or will be understood from the following description of a system embodying the principles thereof which is illustrated in the accompanying drawings in association and combination with elevator apparatus of a usual type having customary control and operating circuits in which a three-phase alternating current is employed.

In the said drawings Fig. 1 is a diagrammatic representation of said elevator system.

Fig. 2 is a side elevation of the speed responsive control mechanism which is preferably utilized therein, and Fig. 3 is an end elevation of said mechanism.

In the several figures like characters are used to designate the same parts.

Reference will first be made to the elevator system diagrammatically shown in Fig. 1 in which automatic starting, stopping, floor selecting, and/or other apparatus and circuits customarily employed in many modern elevators have been omitted to facilitate disclosure of the invention although they may, of course, be incorporated therewith if desired.

Essentially, therefore, the apparatus comprises a main driving motor 1 geared to a winding drum 2 through worm gears 3 respectively carried by motor shaft 4 and drum shaft 5. The elevator car 6 is suspended from a hoisting cable 7 which passes over the winding drum 2 and over an idler sheave 8 for attachment to a counter weight 9 while the main motor shaft 4 carries a brake drum 10 equipped with a mechanical brake 11 adapted to be released by energization of suitable means, such a solenoid 12, connected through conductors 13 and 14 across conductors 15 and 16 leading to the motor 1.

The conductor 15 preferably constitutes one lead of a three phase alternating current derived from a suitable source (not shown) and the other two motor leads 16 and 17 can be connected interchangeably with the other main power leads 18 and 19 through an up-direction switch 20 or a down-direction switch 21 depending on the desired direction of elevator travel. The direction switches are double pole switches with their contacts respectively oppositely connected between the motor leads 16 and 17 and the power leads 18 and 19 so that when the solenoid of the up-direction switch 20 is energized, power lead 18 is connected to motor lead 17 and power lead 19 to motor lead 16 to drive the motor in the direction required to raise the elevator car, and when the solenoid of down-direction switch 21 is energized, power lead 18 is connected to motor lead 16 and power lead 19 to motor lead 17 to drive the motor in the opposite direction to lower the elevator car. As the solenoid 12 for releasing the brake 11 is connected across the power lead 15 and motor lead 16 the brake is released whenever the motor is energized and is applied in the usual way, as by a spring 22, when the motor current and consequently the brake solenoid current, is interrupted.

For operating the elevator the solenoid of up-direction switch 20 is connected on one side through a conductor 24 to the power lead 18 and on the other side through a conductor 25 to a contact 26 on one side of a manual car switch 27. The solenoid of the down-direction switch 21 is similarly connected on one side through a conductor 30 to the power lead 18 and on the other side through conductor 31 to another contact 32 on the opposite side of the manual car switch. The circuit through the car switch whereby the operator can selectively energize either of the direction switch solenoids through contact 26 or contact 32 is completed from additional contacts 35, 36 in the car switch, which are connected together by a common conductor 37, through branch conductors 40 and 41 including solenoids 42 and 43 of a pair of leveling switches hereinafter more fully described, and conductor 44 connecting these branch conductors with main power lead 15. The solenoids 42 and 43 are thus in parallel and being in circuit with the car switch are energized whenever the latter is operated to actuate either of the direction switches; the functions and effects of these solenoids will be hereafter explained in connection with those of the leveling switches just mentioned, neither the said solenoids nor the leveling switches having any appreciable influence upon the normal operation of the elevator between floors in either direction.

These circuits controlling the direction switches 20, 21 to drive the motor during normal operation are thus substantially similar to those customarily employed in elevators of this general character and it will be readily understood that when the car switch 27 is operated so as to interconnect contacts 26 and 35 to energize the up-direction switch 20 the car is raised and when the car switch is operated in the opposite direction to interconnect contacts 32 and 36 and energize the down-direction switch 21, the car is lowered. Of course the contacts of each direction switch open when the corresponding circuit through its solenoid is broken, as when the operator moves the car switch to neutral position and the resultant interruption of the motor and brake solenoid circuits brings the elevator to rest shortly thereafter.

For the purpose of accurately leveling the car so as to ultimately stop it exactly in coincidence with any desired floor after the car switch has been returned to neutral position to open the circuit of that direction switch solenoid which corresponds to the then direction of elevator travel, I provide certain mechanism and circuits now to be described which are maintained in inoperative condition whenever the car switch is in position to energize a direction switch but come into play after it has been returned to neutral and preferably just as the car is thereafter brought to a stop or almost to a stop by the brake 11. This result is attained through the provision of supplementary points 50 and 51 on the car switch whereby a common lead 52 is energized with current from one or the other of points 35, 36 whenever the car switch is in a position to complete either direction switch circuit, the conductor 52 when so connected energizing the solenoid of a delayed relay 53 which is directly connected through a conductor 54 to the main power lead 18. When this relay is energized its switch 55 is open and the relay is preferably so constructed and adjusted to keep this switch open for a short time, preferably about one to two seconds, after the relay solenoid has been deenergized through the return of the car switch to neutral position. Delayed relays adapted for this purpose are well known in the art and the specific details of their construction form no part of the invention, so no further description thereof is required. In fact since the sole function of this relay is to keep the leveling circuits open during normal operation of the car, means other than a delayed relay may be utilized therefor if preferred.

These leveling circuits include a conductor 56 connected through conductor 44 to the power lead 15 and through the relay switch 55 by a conductor 57 to a solenoid 58 adapted to operate a control switch 59 having its contacts 60 in series with said solenoid through a conductor 61. Contacts 60 are also connected through a conductor 62 with leveling switches S, S' carried by the car, conductor 62 being connected to conductor 63 common to both leveling switches.

The leveling switches may be of any desired type but preferably respectively comprise contacts 64, 65 actuated by pivoted spring biased switch arms 66, 67 carrying rollers 68, 69. For actuating these rollers to operate the switch contacts a pair of cams 70, 71 are disposed in the elevator hatch at each floor adjacent the path of the car, cam 70 in position to engage the roller 68 and close contacts 64 of leveling switch S when the car is slightly above a floor and cam 71 in position to engage the roller 69 and close contacts 65 of leveling switch S' when the car is slightly below a floor. The solenoids 42 and 43 of these leveling switches, which are energized when the elevator is being operated by the car switch, maintain the rollers retracted so they cannot engage the cams when the car is passing a floor at which it is not desired to stop; the leveling switch contacts 64, 65 are closed when the rollers are thus retracted but the solenoid of the delayed relay 53 is also energized and keeps the leveling circuits open by means of switch 55. Consequently no current can flow through either of the leveling switch contacts until the car switch has been returned to neutral, thus deenergizing the delayed relay solenoid, and sufficient time has thereafter elapsed for the delayed relay switch 55 to close, which time, as has been noted, preferably corresponds substantially to that required for the brake 11 to bring the car to a stop after interruption of the motor current. In other words solenoids 42 and 43 of the leveling switches perform no function in the actual leveling operation but remain deenergized after the car switch has been brought to neutral until that switch is again operated to move the car, and as the leveling circuit is thereupon opened through energization of the delayed relay 53, the solenoids 42 and 43 operate merely to hold the rollers 68 and 69 retracted from the floor cams when passing a floor to prevent excessive wear on the leveling switches and the cams.

When the car switch is brought to neutral, however, as the car approaches a floor and the delayed relay switch 55 has thereafter closed, the leveling switches S, S' can function to control the leveling circuits, the cams 70, 71 or equivalent means disposed adjacent each floor being then utilized to position the leveling switches in accordance with the relation of the car to the floor, springs 72, 73 at all times urging the pivoted switch arms 66, 67 in the direction to bring the rollers toward the cams.

As has been stated, leveling switch contacts are in circuit through a common lead 63 with the switch 55, solenoid 58 and control switch contacts 60. They are also respectively connected through conductors 76, 77 with the car switch leads 31 and 25 and thus with the direction switch solenoids 21, 20 so that when the circuit is completed through the common lead 63 to the leveling switch contacts 64 and 65, if either of the latter are also closed they complete a circuit through one or the other of the direction switches 21 or 20 to energize the main driving motor and move the car in the appropriate direction. Thus when contacts 64 complete a circuit through conductor 76 to conductor 31 to energize the down-direction switch 21, the car immediately moves downward, and when contacts 65 complete a circuit through conductor 77 to conductor 25 to energize the up-direction switch 20, the car immediately moves in the opposite direction.

The leveling circuits are never brought into play until after deenergization of the solenoid of the delayed relay 53 through operation of the car switch 27 and subsequent operation of the delaying mechanism of the relay to close the switch 55, during which interval the car has presumably come to rest; of course, if it has come to rest exactly at the floor level no leveling is required, but in such case neither leveling switch has its roller on the corresponding cam, both leveling switches are therefore open, and the leveling circuits remain open even after the switch 55 is closed. On the other hand, if the car comes to rest a little above the floor level, the roller 68 rests on the face of the cam 70 and contacts 64 are therefore closed, while if it comes to rest a little below the floor level the roller 69 rests on the cam 71 and contacts 65 are closed; under either condition the closing of the switch 55 of the delayed relay completes a circuit through the contacts of whichever leveling switch is then closed and through the corresponding direction switch thus causing the motor to operate in the direction necessary to bring the car toward the floor. If the car at this time is only a very short distance from the floor, the roller 68 or 69 as the case may be almost immediately moves off its cam with the initial movement of the car thus allowing the corresponding contacts 64 or 65 to open and the resultant interruption of the direction switch circuit stops the motor with the car at the floor level.

But this method of leveling is satisfactory only when the car initially stops very close to the floor for if relied upon when it stops somewhat farther away, the car may approach or even attain its normal operating speed during its subsequent movement towards the floor and would then coast beyond it through the momentum of the various mechanisms involved after interruption of the motor circuit, thereby necessitating its having to be moved back in the opposite direction to bring it into coincidence with the floor; the leveling system of my invention therefore comprises means now to be more fully described which prevent the motor attaining or even approaching its normal speed under such conditions.

In general these means comprise speed responsive mechanism such as the control switch 59 to which reference has been made and which may be of any desired form, the switch 59 illustrated in Figs. 2 and 3 constituting merely one type of speed responsive control switch I consider eminently suitable for the purpose. Essentially this switch comprises a shaft 80 rotatable in a movable frame 81 and carrying elements 82 pivotally connected to a collar 83 fixed on the shaft and to a plate 84 slidable on the shaft; the elements 82 are thus adapted to move outwardly from the shaft under the influence of centrifugal force against the bias of a spring or springs 85 interconnecting the elements, and when they do so move they cause the plate 84 to slide along the shaft toward the fixed collar 83. The switch contacts 60 are controlled by the slidable plate 84 which opens the contacts as it moves toward the collar 83; the opening of the circuit through the switch contacts thus depends upon the rate of rotation of the shaft 80, and in practice the mechanism is desirably so adjusted that contacts 60 open when the shaft 80 attains a speed corresponding to a car speed of about 15 to 20 ft. per minute.

The frame 81 supporting the shaft 80 is pivoted on a shaft 87 carried by a housing 88 preferably positioned adjacent the brake drum 10 so as to admit of movement of the frame in a plane normal to the brake drum axis. Shaft 80 projects beyond the housing adjacent the rim of the brake drum and is provided with a friction pulley 90 which can thus be brought into engagement with the rim of the drum by movement of the frame about its supporting shaft. A spring 91 is interposed between the frame and the housing so as to urge the former in a direction to move the friction pulley away from the drum and mechanism operated by solenoid 58 is provided for moving it towards the drum. This mechanism comprises the solenoid armature 92 and a threaded rod 93 pivoted to it which extends loosely through and actuates a lever 94, cushion springs 95, 96 being disposed on the rod on opposite sides of the lever and their tension against it being adjustable by nuts 97, 98 threaded on the rod. The lever is pivoted to the housing on a pin 99 and has pivoted to it adjacent this pin a link 100 which is in turn pivoted to a second link 101 also pivoted on the housing by pin 102. Link 101 is engaged by an adjusting screw 103 threaded into a boss 104 on frame 81 and the screw is held in engagement with the link by the thrust of spring 91 against the frame. Thus as the solenoid is energized to draw its armature downwardly in Fig. 3, lever 94 and links 100, 101 swing the frame to the left and thus bring friction pulley 90 into engagement with the inner surface of brake drum 10 or other moving part suitable for driving it and when the circuit through the solenoid is opened the frame is swung in the opposite direction through action of spring 91, until collar 83 engages a stop 105 of rubber or other suitable material carried by the housing which arrests rotation of shaft 80 when collar 83 is brought against it, a spring 106 biased between lever 94 and the housing serving to lift the solenoid armature during this movement. Obviously the relation of the friction pulley to the drum may be determined by adjustment of screw 103 so as to insure positive rotation of the pulley whenever the solenoid is energized.

*Leveling operation*

The leveling of the car, as has been noted, takes place, in accordance with the invention, only when the switch 55 has closed through the operation of the delayed relay 53 after its solenoid has been deenergized by operation of the car switch 27. If either of the leveling switch contacts 64 or 65 is then closed as a result of the car stopping or almost stopping at a point above or below the floor at which it is to be brought to rest, the closing of the switch 55 completes a leveling circuit as a result of which one of the direction switches 20 or 21 is energized to start the motor and move the car toward the floor, and at the same time pulley 90 is brought against the brake drum 10 through movement of the frame 81 induced by the simultaneous energization of solenoid 58. Thus as the motor starts, the shaft 80 is rotated at a gradually increasing speed corresponding to that of the motor during its initial acceleration. When the shaft 80 attains the speed at which centrifugal elements 82 have been adjusted to cause the contacts 60 to open, however, that is, preferably when the car reaches the predetermined leveling speed of about 15 to 20 ft. per minute or other suitable speed, the leveling circuit is interrupted, deenergizing the solenoid 58, which permits the spring 91 to move the frame in a direction to withdraw the pulley 90 from engagement with the drum and bring the collar 83 against the stop 105 to arrest rotation of the shaft 80, at the same time deenergizing that direction switch which was just previously energized for moving the car and the latter therefore immediately slows down.

If the car has then reached the floor level the contacts 64 and 65 are both open due to the position of the leveling switch rollers relatively to their cams, and slowing of the shaft 80 below the speed corresponding to that for which the elements 82 have been adjusted to keep the contacts 60 open does not reestablish a leveling circuit when these contacts close, so the car comes to rest. If, however, after interruption of the circuit by opening of the contacts 60 the car has not arrived at the floor level before these contacts again close, a leveling circuit is re-established almost immediately, reenergizing the main motor to again positively move the car towards the floor and again bringing the pulley 90 into engagement with the drum 10 to drive the shaft 80. These operations are repeated until the car attains the floor level, taking place in quite rapid succession and continuing as long as either leveling switch is closed through its roller being on the corresponding cam. The contacts 60 thus open to deenergize the leveling circuit each time the car attains the predetermined leveling speed but due to the immediate slowing of shaft 80 in the control switch after this speed has been attained, they again close almost immediately to re-establish a leveling circuit and maintain it until, and only until, that speed is again attained; thus after the leveling operation is initiated the car moves at a speed which is limited to that for which the control switch has been set, and very rapid and accurate leveling is obtained, while coasting of the car past the floor due to excessive leveling speed is prevented.

In effect the leveling circuits thus operate to move the car toward the floor at a maximum speed of about 15 to 20 ft. per minute, if, as is preferable, that is the speed range for which the control switch has been adjusted to open contacts 60, and this operation, which is carried out entirely independently of the normal operating speed of the driving motor, brings the car to rest at the floor level when that level is reached.

It will be apparent that the apparatus herein described may advantageously be utilized in elevator systems of various types other than that disclosed herein or in my said Patent 1,939,656, and thus in substantially any manual, semi-automatic and/or completely automatic elevator system whether or not such system is provided with means for approximately leveling the car, and/or with other control devices.

Therefore, while I have herein shown and described my invention with considerable particularity as embodied in a specific elevator system including certain circuits and parts I consider well adapted for use in attaining the objects of the invention, it will be understood that I do not intend thereby to limit or confine myself thereto in any way as the principles of my leveling system may be utilized in elevator control systems of substantially any character and any suitable mechanism and circuits may be employed in applying such principles, and changes and modification in the form, construction and arrangement of the several mechanical elements and control circuits will readily occur to those skilled in the art and may be made if desired without departing from the spirit and scope of the invention as defined in the appended claims.

Having thus described my invention, I claim and desire to protect by Letters Patent of the United States:

1. The combination with an elevator car, an electric driving motor therefor and control means for selectively energizing it to move the car, of speed responsive means cooperative with said control means to restrain the motor from exceeding a given speed less than its normal operating speed when said motor after moving the car at such normal speed has been deenergized and subsequently reenergized when the car is within a predetermined zone adjacent the floor and means for so reenergizing the motor when the car is in said zone.

2. The combination with an elevator car, an electric driving motor therefor and means for selectively energizing it to move the car, of a leveling circuit controlling said motor energizing means, means for energizing said circuit when the car is within a predetermined zone adjacent a floor and speed responsive means driven from the motor for interrupting said circuit when the motor attains a predetermined speed less than its normal speed while the car is within said zone.

3. In a leveling circuit for an electric elevator, a speed responsive switch comprising centrifugal switch contact control means, means for driving said control means from the elevator motor and means in circuit with the switch contacts for controlling said switch driving means in accordance with the speed of said switch driving means.

4. In a leveling circuit for controlling an electric elevator driving motor and a normal driving circuit therefor to bring the elevator car to a stop at a floor level, a control switch, speed responsive means for operating said switch including means adapted to be driven from the motor and means in circuit with said switch operative when the leveling circuit is completed to cause said speed responsive means to be driven from the motor.

5. In a leveling circuit for controlling an electric elevator driving motor and a normal driving circuit therefor to bring the elevator car to a stop at a floor level, a control switch, speed responsive means for operating said switch including means adapted to be driven from the motor, means in circuit with said switch operative when the leveling circuit is completed to cause said speed responsive means to be driven from the motor and means for interrupting the drive of the speed responsive means when said leveling circuit is interrupted.

6. In a leveling circuit for controlling an electric elevator driving motor and a normal driving circuit therefor to bring the elevator car to a stop at a floor level, a control switch, speed responsive means for operating said switch including means adapted to be driven from the motor, means in circuit with said switch operative when the leveling circuit is completed to cause said speed responsive means to be driven from the motor, means for interrupting the drive of the speed responsive means when said leveling circuit is interrupted and means for interrupting said leveling circuit when the car attains the floor level.

7. In a leveling circuit for controlling an electric elevator driving motor and a normal driving circuit therefor to bring the elevator car to a stop at a floor level, a control switch, speed responsive means for operating said switch including means adapted to be driven from the motor, means in circuit with said switch opera- tive when the leveling circuit is completed to cause said speed responsive means to be driven from the motor, means for interrupting the drive of the speed responsive means when said leveling circuit is interrupted and means for interrupting said leveling circuit when the car attains the floor level comprising a pair of switches connected in parallel in said leveling circuit responsive to movement of the car to the floor level from opposite directions.

8. In a leveling circuit for controlling an electric elevator driving motor and a normal driving circuit therefor to bring the elevator car to a stop at a floor at which it is to be leveled, a control switch, speed responsive means for operating said switch including means adapted to be driven from the motor, means in circuit with said switch operative when the leveling circuit is completed to cause said speed responsive means to be driven from the motor and means for maintaining the leveling circuit deenergized during normal operation of the elevator and for a predetermined time interval after interruption of the normal driving circuit of the motor as the car approaches the floor.

9. In a leveling circuit for controlling an electric elevator driving motor and a normal driving circuit therefor to bring the elevator car to a stop at a floor level, a control switch, speed responsive means for operating said switch including means adapted to be driven from the motor, means in circuit with said switch operative when the leveling circuit is completed to cause said speed responsive means to be driven from the motor and means for maintaining the leveling circuit deenergized during normal operation of the elevator and for a predetermined time interval after interruption of the normal driving circuit of the motor as the car approaches the floor at which it is to be leveled comprising a switch, a solenoid in said normal driving circuit adapted when energized to open said last mentioned switch and means for closing said last mentioned switch a predetermined time after deenergization of the solenoid.

10. The combination with an elevator car, a driving motor therefor and operating circuits for selectively actuating the motor in opposite directions, of a leveling circuit for controlling the operating circuits to bring the car to rest at a floor level, means for maintaining the leveling circuit inoperative during, and for a predetermined time after, normal operation of an operating circuit, and means responsive to the motor speed and operative after interruption of said operating circuit for interrupting the leveling circuit upon attainment by the car of a predetermined speed while the car is in process of being leveled.

11. The combination with an elevator car, a driving motor therefor and operating circuits for selectively actuating the motor in opposite directions, of means for moving the car when it is within a predetermined distance from a floor at which it is desired to bring it to rest comprising a leveling circuit adapted to control said operating circuits, means for energizing the leveling circuit when the car is within said predetermined distance and speed responsive means then operative to successively interrupt the leveling circuit upon attainment by the motor of a predetermined speed and to reestablish said circuit after such interruption to thereby progressively move the car towards the floor at an average speed less than that corresponding to said predetermined motor speed.

12. The combination with an elevator car, a driving motor therefor and operating circuits for selectively actuating the motor in opposite directions, of means for moving the car when it is within a predetermined distance from a floor at which it is desired to bring it to rest comprising a leveling circuit adapted to control said operating circuits, means for energizing the leveling circuit when the car is within said predetermined distance, speed responsive means then operative to successively interrupt the leveling circuit upon attainment by the motor of a predetermined speed and to reestablish said circuit after such interruption to thereby progressively move the car towards the floor at an average speed less than that corresponding to said predetermined motor speed and means for interrupting the leveling circuit when the car attains coincidence with the floor level.

13. In an electric elevator system, an elevator car, a motor for driving the car in a hatchway past a landing, means for causing the motor to operate at a high speed when the car is making a run to the landing, leveling means responsive to the position of, and for initiating operation of the motor to move the car toward said landing and a speed responsive device driven from the motor and operative to successively energize and deenergize the motor in accordance with the motor speed to thereby limit the average power applied to the motor during leveling to less than the average power applied thereto during normal high speed operation.

14. In an electric elevator system, an elevator car, control means for the driving motor including means operable to interrupt the drive adjacent a floor level, means operative to automatically reestablish the drive after such interruption as the car approaches said floor level and speed responsive means operative to automatically interrupt such reestablished drive upon attainment by the car during leveling of a predetermined speed less than its normal speed during operation between spaced leveling zones.

15. In an electric elevator system, an elevator car, control means for the driving motor including means operable to interrupt the drive adjacent a floor level, means operative to automatically reestablish the drive after such interruption as the car approaches said floor level and means driven from the motor at a speed corresponding to the car speed and responsive thereto operative to again interrupt the drive upon attainment by the car of a predetermined speed less than its normal speed.

JOSEPH H. BORDEN.